(12) United States Patent
Hsu et al.

(10) Patent No.: US 8,947,867 B2
(45) Date of Patent: Feb. 3, 2015

(54) SLIDING-TYPE ELECTRONIC APPARATUS WITH STRENGTHENING FORCE STRUCTURE

(75) Inventors: An Szu Hsu, New Taipei (TW);
Way-Han Dai, New Taipei (TW);
Hsiu-Fan Ho, New Taipei (TW)

(73) Assignee: First Dome Corporation, New Taipei (TW)

( * ) Notice: Subject to any disclaimer, the term of this patent is extended or adjusted under 35 U.S.C. 154(b) by 239 days.

(21) Appl. No.: 13/593,560

(22) Filed: Aug. 24, 2012

(65) Prior Publication Data
US 2014/0055938 A1 Feb. 27, 2014

(51) Int. Cl.
*H05K 5/00* (2006.01)

(52) U.S. Cl.
USPC ............ 361/679.21; 361/679.35; 361/679.39; 361/679.44; 361/679.26; 361/679.3

(58) Field of Classification Search
USPC ............... 361/679.21, 679.12, 679.2, 679.26, 361/679.35, 679.3, 679.39, 679.44; 455/575.3, 575.4
See application file for complete search history.

(56) References Cited

U.S. PATENT DOCUMENTS

| | | | | |
|---|---|---|---|---|
| 6,288,891 B1 * | 9/2001 | Hasegawa et al. | ....... | 361/679.07 |
| 7,301,759 B2 * | 11/2007 | Hsiung | ................... | 361/679.27 |
| 7,922,133 B2 * | 4/2011 | Hsu | ................................ | 248/127 |
| 8,226,054 B2 * | 7/2012 | Chen et al. | .................... | 248/127 |
| 8,256,725 B2 * | 9/2012 | Wang et al. | .................... | 248/157 |
| 8,315,044 B2 * | 11/2012 | Wu et al. | .................. | 361/679.02 |
| 2006/0032998 A1 * | 2/2006 | Depay | ........................ | 248/291.1 |
| 2014/0063717 A1 * | 3/2014 | Tseng et al. | ............. | 361/679.21 |

* cited by examiner

*Primary Examiner* — Robert J Hoffberg
*Assistant Examiner* — Hung Dang
(74) *Attorney, Agent, or Firm* — Rosenberg, Klein & Lee

(57) ABSTRACT

A sliding-type electronic apparatus with a strengthening force structure includes a body served as a system terminal and an upper cover disposed on the body and having a surface configured with a touch screen. A sliding and cover-lifting member constituted by a sliding rail, a sliding member and a pivot shaft device is at least disposed between the body and the upper cover. In a normal state, a supporting device, together with the sliding and cover-lifting member, is horizontally and supportively placed in a preset concave chamber space of the body. The auxiliary supporting devices can be formed as an inclined auxiliary support structure on the rear surface of the upper cover when the upper cover is lifted, thereby effectively increasing the screen touch resistance to inhibit screen wobble in an operation process and to promote the support effect and operation stability of the screen.

20 Claims, 8 Drawing Sheets

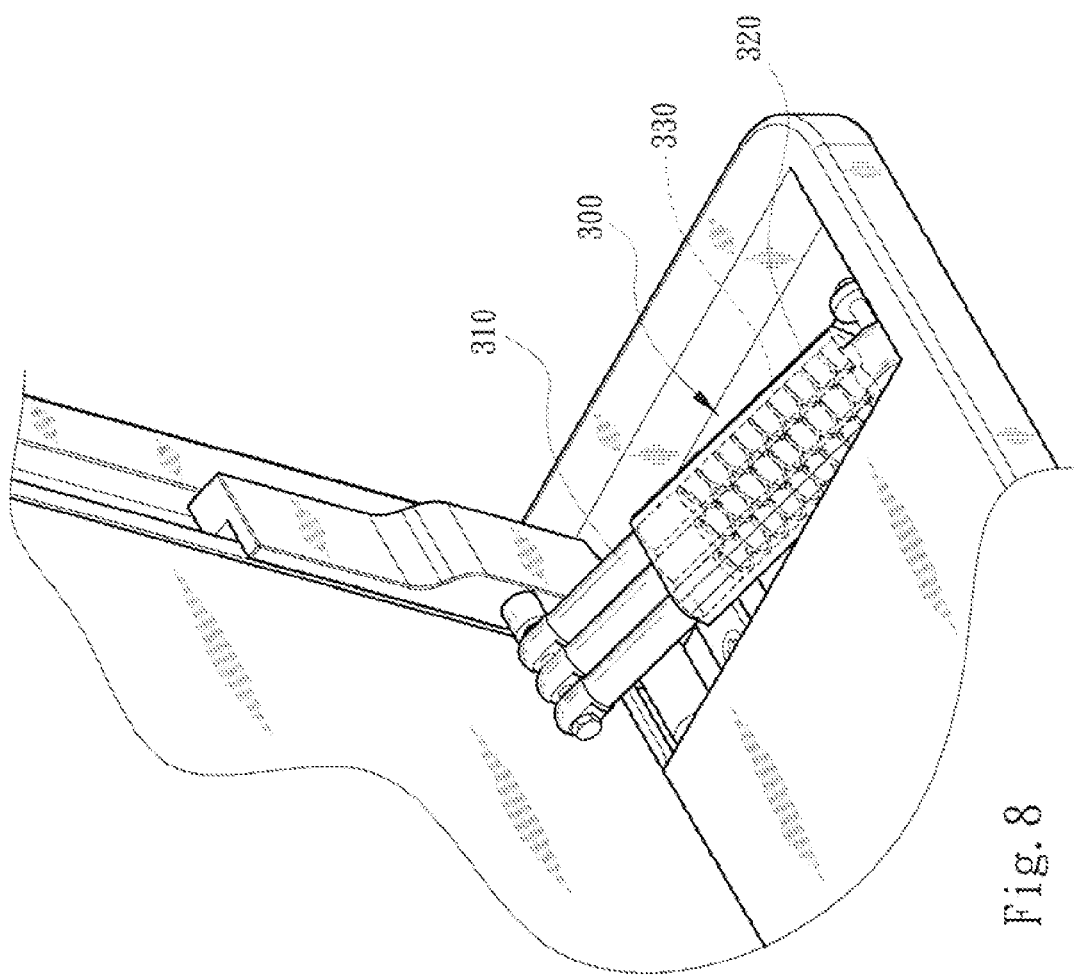

US 8,947,867 B2

SLIDING-TYPE ELECTRONIC APPARATUS WITH STRENGTHENING FORCE STRUCTURE

BACKGROUND OF THE INVENTION

1. Field of the Invention

The invention relates to a sliding-type electronic apparatus with a strengthening force structure, in particular relates to an electronic apparatus providing an upper cover capable of being shifted and then lifted with respect to a body and forming an inclined auxiliary support structure on a rear surface of the upper cover when the upper cover is lifted, thereby forming a resistance structure to inhibit screen wobble in an operation process.

2. Description of the Related Art

In general, an electronic apparatus such as a notebook, computer generally includes a body served as a fixed system terminal and a liftable movable touch screen upper cover, and such as a pivot shaft deice is utilized to connect to opposite end portions of the body and the upper cover, so that the upper cover can be upwardly lifted as being a working state or downwardly closed on a surface of the body by taking the pivot shaft device as a motion axis. However, there have structural variations among these electronic apparatuses in accordance with different designs. Some provide a movable pivot directly applied on the opposite end portions of the body and the upper cover, but some provide a body system terminal disposed under the upper cover so that the upper cover can be slidably shifted and then upwardly lifted with respect to the body system terminal.

In modern times, the majority of display screens of electronic apparatuses are touch panels. No matter what structural designs have been applied to these electronic apparatuses, the upper cover is often controlled by a user's finger(s) pressing on the panel (the touch screen) in an inclined lifting load state. However, due to a distance formed between the zone of the panel and the pivot shaft device (the motion axis), the pivot shaft device will be formed with a larger acting moment when the panel is forced, thus resulting in the pivot shaft device to be easily damaged or difficulties of retaining the positioning function as the pivot shaft device is rotated to a fixed point. Moreover, due to insufficient supporting force to the touch screen, the screen of the electronic apparatus (e.g., notebook computers) tends to be wobbled or in an unstable state as the electronic apparatus is forced.

These defects are particularly often occurred in the above-described sliding-type electronic apparatus. The major reason is that, in the operation process of the sliding-type electronic apparatus, the upper cover shall be slidably pushed at a distance by a related slide mechanism with respect to the body, and the upper cover is lifted at a working angle by taking a rotary shaft as a motion axis and then kept at the working angle by a related support structure. However, it is usually that the strength of the related support structure of the conventional sliding-type electronic apparatus cannot effectively keep the screen in a stable operation state of no wobble, and the related slide mechanism of the sliding-type electronic apparatus is pretty complicated. Thus, it is an important topic, based on the structure pattern of the above-described sliding-type electronic apparatus, to provide a design structure without increasing space and thickness thereof.

BRIEF SUMMARY OF THE INVENTION

In view of this, the main purpose of the invention is to provide a sliding-type electronic apparatus with a strengthening force structure, capable of effectively increasing the screen touch resistance to inhibit screen wobble in the operation process.

Another purpose of the invention is to provide a sliding-type electronic apparatus with a strengthening force structure, capable of forming a better screen support effect and operation stability.

Still another purpose of the invention is to provide a sliding-type electronic apparatus with a strengthening force structure, capable of forming a screen strengthening force structure without increasing space and thickness of the sliding-type electronic apparatus.

Yet another purpose of the invention is to provide a sliding-type electronic apparatus with a strengthening force structure, capable of lifting an upper cover of the sliding-type electronic apparatus in a labor-saving way.

To attain the purpose above, a sliding-type electronic apparatus of the invention includes a body served as a system terminal and an upper cover disposed on the body and having a surface configured with a touch screen. A sliding and cover-lifting member constituted by a sliding rail, a sliding member and a pivot shaft device is at least disposed between the body and the upper cover. At least one concave chamber space configured on a position to be close to an end portion on a surface of the body is utilized to accommodate the sliding member of the sliding and cover-lifting member therein. A support frame is assembled to the pivot shaft device. A supporting device is assembled in the concave chamber space. The supporting device includes one end continuously connected to the sliding member and another end pivoted to an opposite end portion of the support frame. When the upper cover is lifted and positioned, the auxiliary supporting devices is formed as an inclined auxiliary support structure on the upper cover to bear an operation force from the touch screen of the upper cover.

In an executable embodiment, a support seat is preset in the concave chamber space, the support frame is fixed on the support seat by opposite folding pieces, and the pivot shaft device penetrated through a preset hole of the support frame is connectively assembled to the sliding member via an outwardly-extended pivot shaft.

In an executable embodiment, the supporting device is constituted by a connecting rod and a sleeve comprising an elastic member set with elastic coefficient therein.

In a preferred embodiment, the connecting rod includes a rod body partially entered inside the sleeve, one end served as a continuously-connected end for the sliding member, and another end entered inside the sleeve and normally pressed against the elastic member, and the sleeve includes a bottom end pivoted to the opposite end portion of the support frame.

In another executable embodiment, the sleeve of the supporting device is dimensionally enlarged to form with a plurality of housing apertures, so that a plurality of connecting rods and a plurality of elastic members can be simultaneously placed in the housing apertures of the sleeve, thereby increasing the auxiliary supporting force to the whole supporting device.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 8 is an enlarged view of the components in a combination state of FIG. 7.

DETAILED DESCRIPTION OF THE INVENTION

Figure 1:
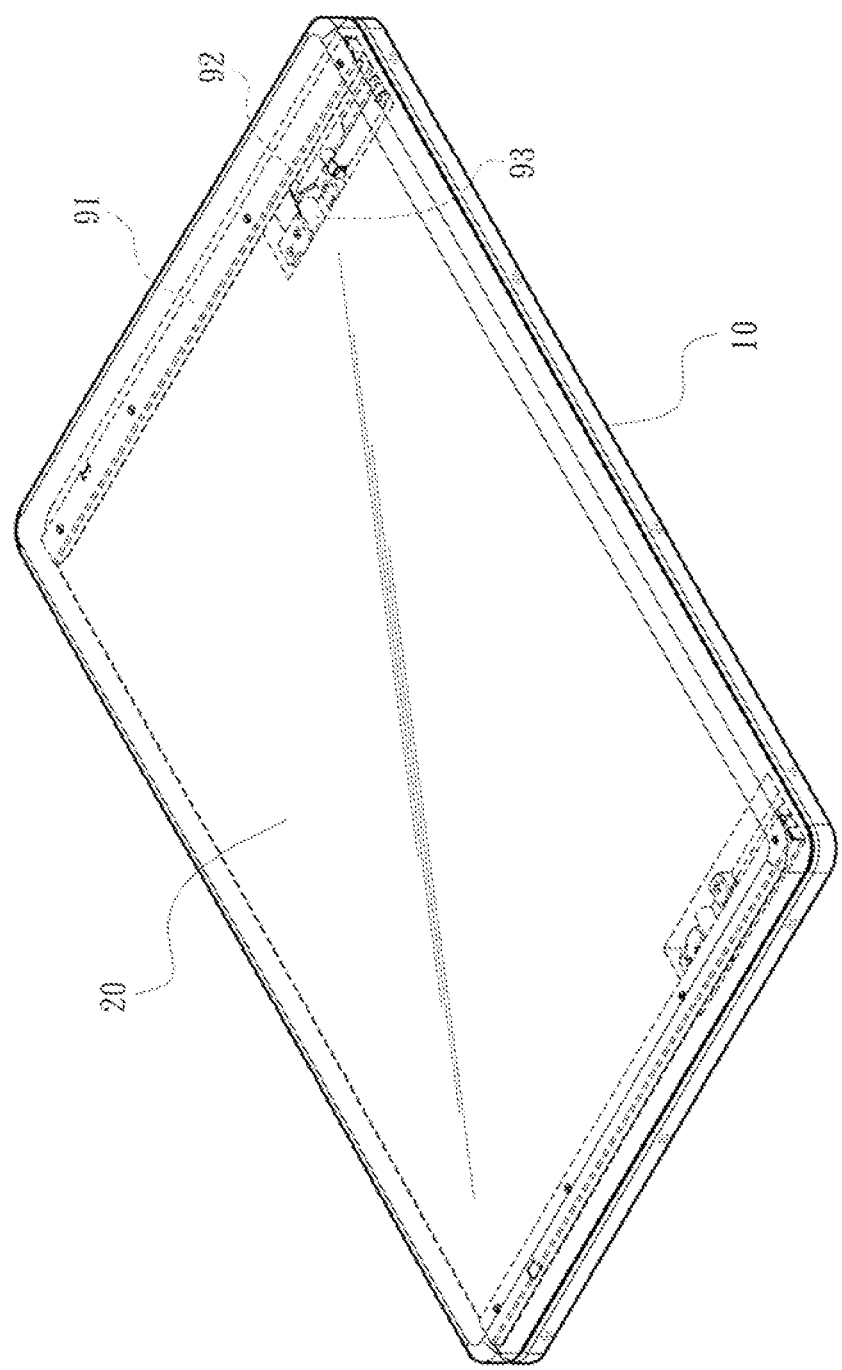
FIG. 1 is a schematic view of a preferred embodiment of the invention installed on a sliding-type electronic apparatus, in which related components hidden in the sliding-type electronic apparatus are illustrated by dotted lines.

Referring to FIG. 1, a sliding-type electronic apparatus comprises a body 10 and an upper cover 20, in which the body 10 is served as a system terminal, and the upper cover 20 disposed on the body 10 has a surface generally configured with a touch screen. Sliding rails 91, sliding members 92 and pivot shaft devices 93 are disposed between the body 10 and the upper cover 20, so that the upper cover 20 can be lifted after the upper cover 20 is slidably shifted on the body 10 for a certain distance. The sliding rails 91, the sliding members 92 and the pivot shaft devices 93 constitute a sliding and cover-lifting member disposed between the body 10 and the upper cover 20, in which the sliding member 92 and the pivot shaft device 93 are configured on the body 10, and the member 92 is disposed at a position to be close to an end portion on a surface of the body 10 and assembled to the pivot shaft device 93.

Figure 2:
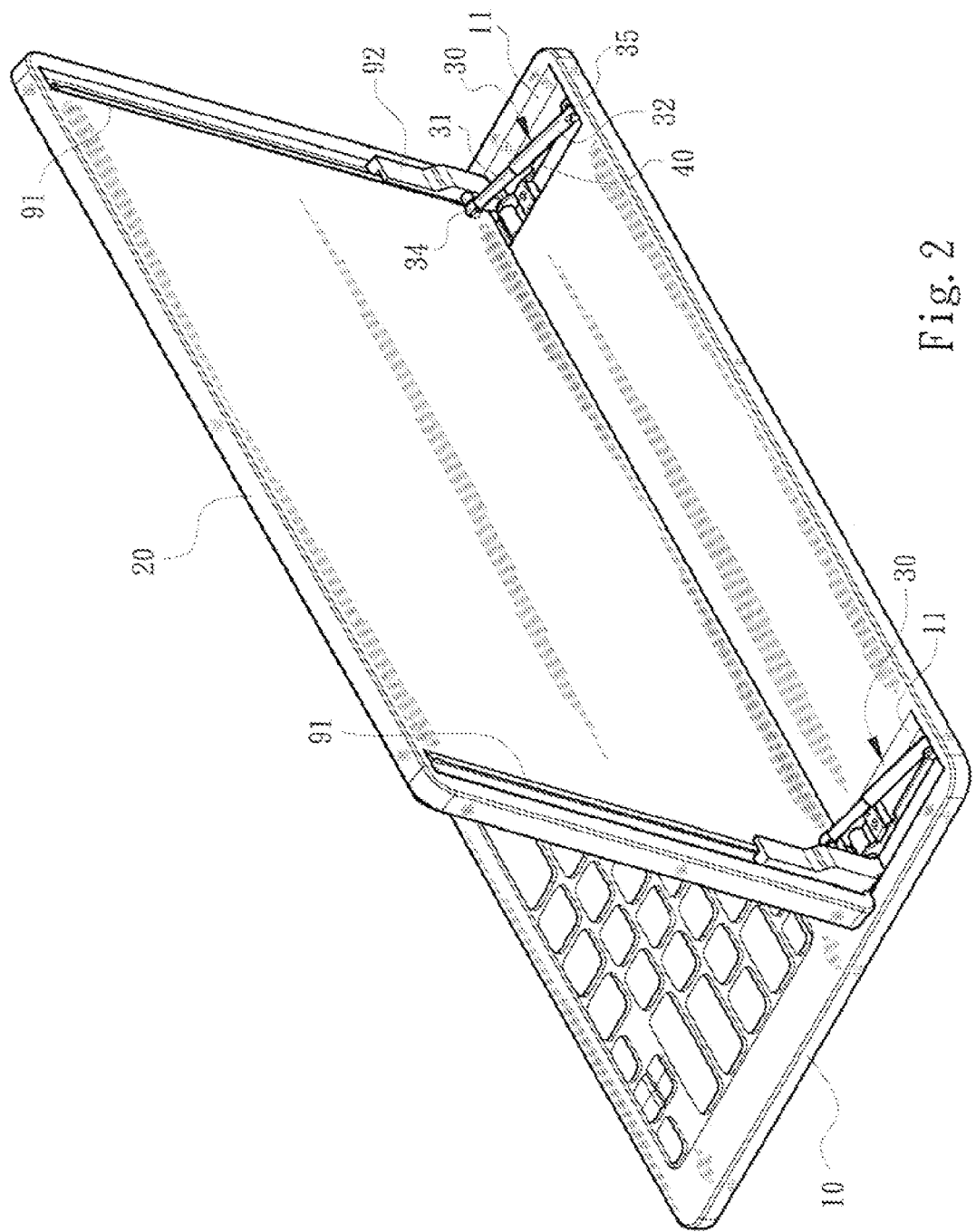
FIG. 2 is a perspective view of the embodiment in FIG. 1, illustrating that an upper cover is lifted.
Figure 3:
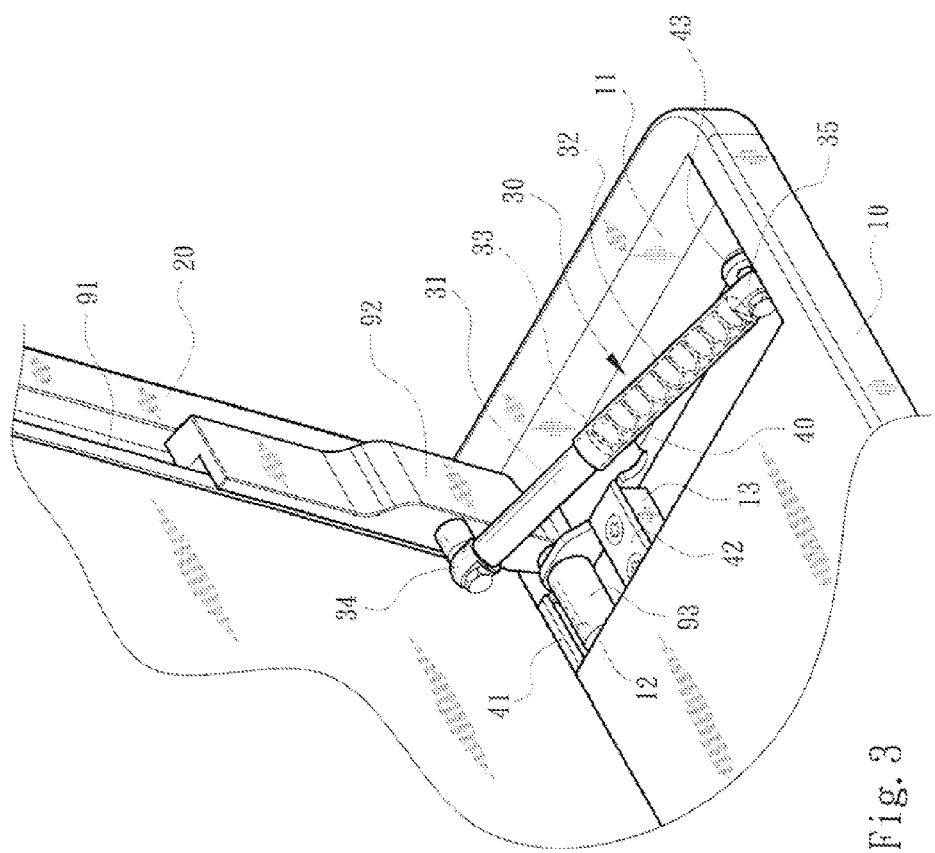
FIG. 3 is an enlarged view illustrating one side of the structure in FIG. 2.
Figure 4:
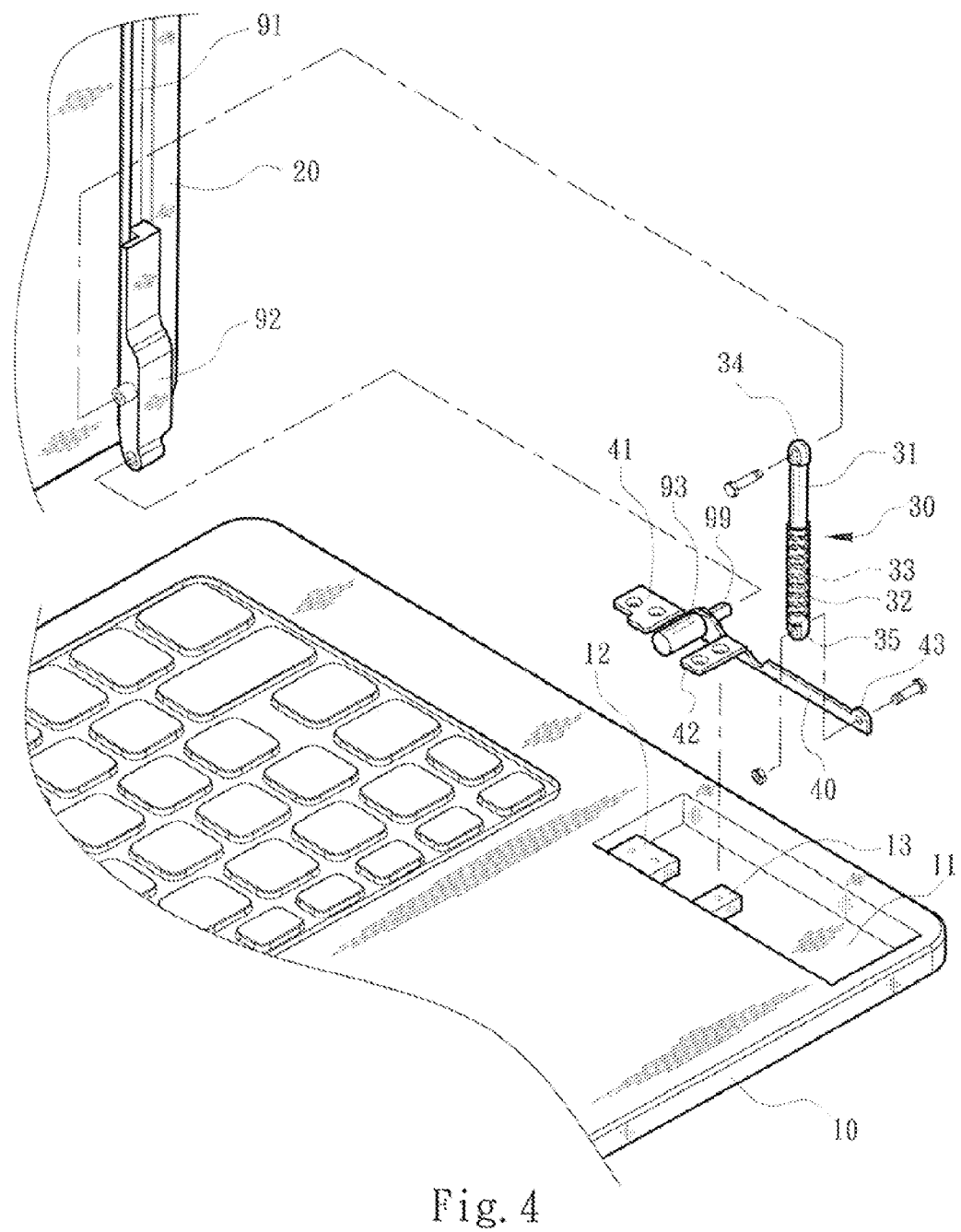
FIG. 4 is an exploded view of components of the embodiment in FIG. 1.

As shown in FIGS. 2, 3 and 4, the sliding rails 91 are configured on two side positions of the back surface of the upper cover 20. With the sliding rails 91 cooperated with the sliding members 92, the upper cover 20 can be slidably shifted on the body 10 in preparation for performing an opening process, or a closing process opposite to the opening process. In cooperation with the related sliding and cover-lifting member, the invention further comprises two supporting devices 30 respectively disposed at two relative positions to be close to two ends on a surface of the body 10. In the implementation as shown in figures, a concave chamber space 11 is further disposed at the position of the end portion of the body 10, in which the sliding member 92 is accommodated in the concave chamber space 11 in a flat manner when the body 10 and the upper cover 20 are normally closed, and the supporting device 30 can be assembled in the concave chamber space 11.

The pivot shaft device 93 is positioned and assembled on the surface of the body 10 or in the concave chamber space 11, and support seats 12 and 13 are preset in the concave chamber space 11. A support frame 40 having opposite folding pieces 41 and 42 is positioned and assembled on the support seats 12 and 13, and the pivot shaft device 93 is installed on the support frame 40 (as shown in FIG. 4). Besides, the pivot shaft device 93 penetrated through a preset hole of the support frame 40 is connectively assembled to the sliding member 92 via an outwardly-extended pivot shaft 99.

As shown in figures, in the preferred embodiment, the supporting device 30 is constituted by a connecting rod 31 and a sleeve 32 comprising an elastic member 33 set with elastic coefficient therein. The supporting device 30 includes one end 34 continuously connected to the sliding member 92 and another end 35 fixedly pivoted to a position where is more closer to an edge of the body 10 than an installation position of the pivot shaft device 93 on the surface of the body 10. That is, another end 35 of the supporting device 30 is pivoted to an opposite end portion 43 of the support frame 40. In this embodiment, the connecting rod 31 of the supporting device 30 includes a rod body partially entered inside the sleeve 32, one end served as a continuously-connected end for the sliding member 92, and another end entered inside the sleeve 32 and normally pressed against the elastic member 33. The sleeve 32 includes a bottom end pivoted to the opposite end portion 43 of the support frame 40.

Figure 5:
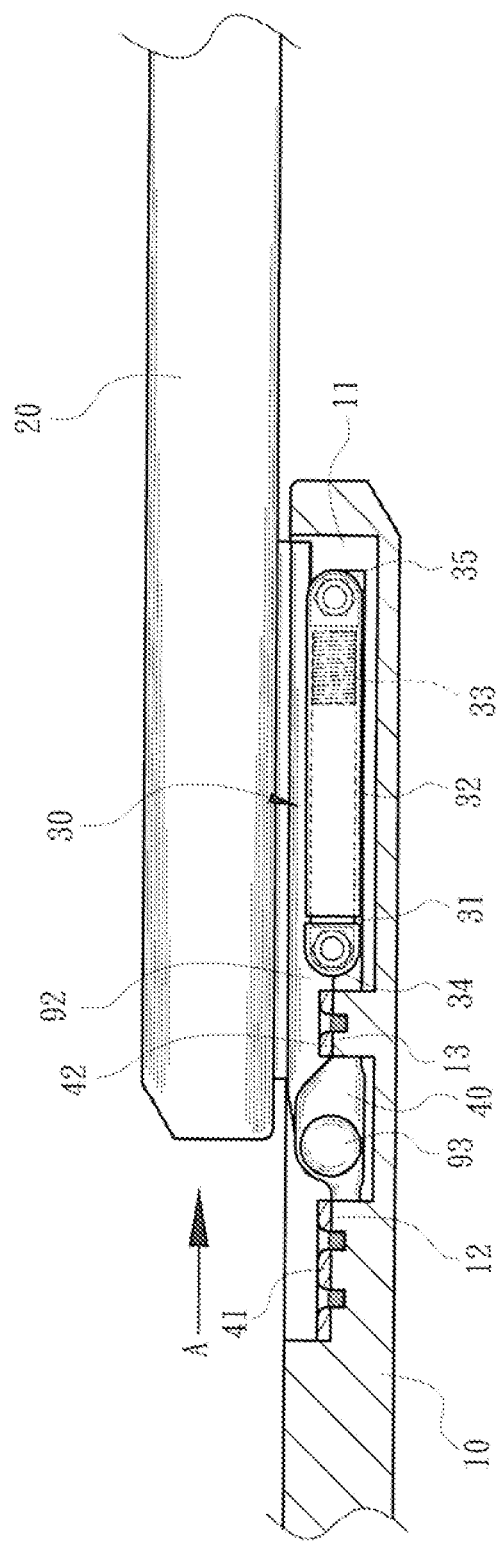
FIG. 5 is a sectional view of the structure in a combination state of FIG. 4, in which an upper cover is located at a sliding and outward-push position.
Figure 6:
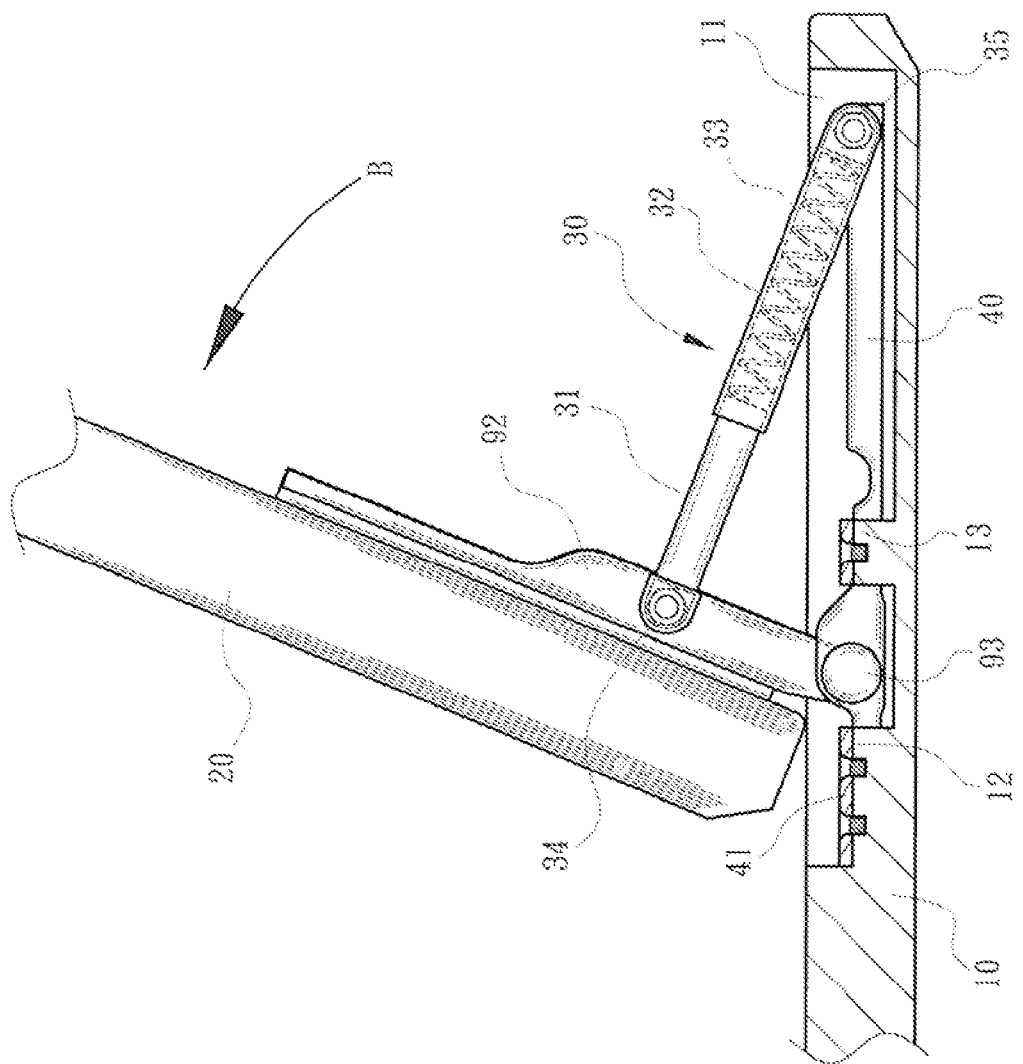
FIG. 6 is a continue motion diagram of FIG. 5, illustrating that the upper cover is lifted at a particular working angle.

As shown in FIG. 5, the sliding member 92 and the supporting device 30 are horizontally installed in or supported in the concave chamber space 11 in a normal state. In a continue motion of FIG. 5 as shown in FIG. 6, when the upper cover 20 is lifted in the direction of an arrow B by taking the pivot shaft devices 93 as a motion axis, the supporting device 30 is motioned, following a face-upward movement of the sliding member 92, so that the connecting rod 31 of the supporting device 30 and the continuously-connected end of the sliding member 92 is upwardly pivoted by taking the bottom end of the sleeve 32 which is pivoted to the opposite end portion 43 of the support frame 40 as a motion axis. With the supporting device 30 fully supporting to the rear surface of the upper cover 20 at an inclined angle (as shown in FIG. 6), the supporting device 30 can be served as a strengthening auxiliary support member when the surface touch screen of the upper cover 20 is operably pushed and pressed.

When the upper cover 20 is slidably shifted on the body 10 to arrive at a fixed point in preparation for performing an upward lifting process, the elastic member 33 situated in a compression state (shown in FIG. 5) exerts an elastic recovery force to assist in upwardly lifting the upper cover 20.

Figure 7:
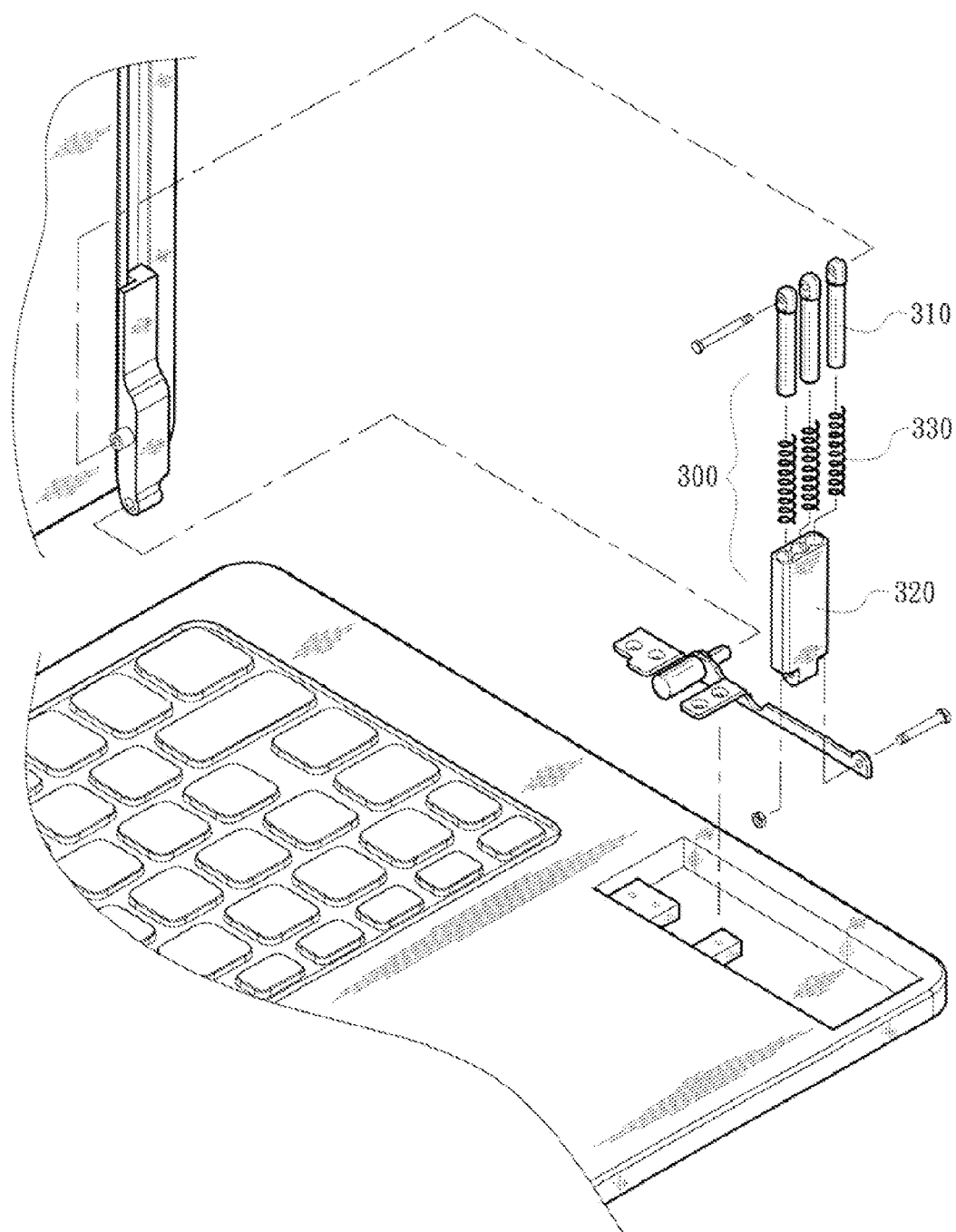
FIG. 7 is an exploded view of components of another executable embodiment of the invention.

Referring to FIGS. 7 and 8, in an executable embodiment of the invention, a supporting device 300 is constituted by a plurality of connecting rods 310 and a sleeve 320 comprising a plurality of preset housing apertures which are provided for placing in a plurality of elastic members 330 set with elastic coefficient. Each of the connecting rods 310 includes a rod body partially entered inside the sleeve 320, one end served as a continuously-connected end for a sliding member, and another end entered inside the sleeve 320 and normally pressed against the elastic member 330, in which the sleeve 320 includes a bottom end pivoted to an opposite end portion of a support frame.

In FIGS. 7 and 8, the sleeve 320 of the supporting device 300 is dimensionally enlarged, so that the connecting rods 310 and the elastic members 330 can be simultaneously placed in the housing apertures of the sleeve 320, thereby increasing the auxiliary supporting force to the whole supporting device 300.

With the auxiliary supporting devices to be formed on the rear surface of the upper cover when the upper cover of the sliding-type electronic apparatus is lifted, the screen touch resistance can be effectively increased to inhibit screen wobble in the operation process, and also the support effect and operation stability of the screen can be promoted. Besides, a screen strengthening force device can be formed without increasing space and thickness of the sliding-type electronic apparatus.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A sliding-type electronic apparatus with a strengthening force structure, comprising:
   a body being a system terminal;
   an upper cover disposed on the body and having a surface configured with a touch screen;
   a sliding and cover-lifting member at least disposed between the body and the upper cover; and
   a supporting device;
   wherein a sliding rail is configured on the upper cover, a sliding member and a pivot shaft device are configured on the body;
   the sliding and cover-lifting member includes the sliding rail, the sliding member and the pivot shaft device;
   the sliding member of the sliding and cover-lifting member is disposed at a position to be close to an end portion on a surface of the body and assembled to the pivot shaft device; and
   the supporting device includes one end continuously connected to the sliding member and another end fixedly pivoted to a position closer to an edge of the body than an installation position of the pivot shaft device on the surface of the body.

2. The sliding-type electronic apparatus with the strengthening force structure as claimed in claim 1, wherein the sliding member, the pivot shaft device and the supporting device are respectively installed in a concave chamber space disposed at the position of the end portion of the body.

3. The sliding-type electronic apparatus with the strengthening force structure as claimed in claim 2, wherein a support frame is disposed in the concave chamber space to install the pivot shaft device, and the support frame is configured with an opposite end portion pivoted to another end of the supporting device.

4. The sliding-type electronic apparatus with the strengthening force structure as claimed in claim 3, wherein a support seat is preset in the concave chamber space, the support frame is fixed on the support seat by opposite folding pieces, and the pivot shaft device penetrated through a preset hole of the support frame is connectively assembled to the sliding member via an outwardly-extended pivot shaft.

5. The sliding-type electronic apparatus with the strengthening force structure as claimed in claim 1, wherein the supporting device is constituted by a connecting rod and a sleeve comprising an elastic member set with elastic coefficient therein.

6. The sliding-type electronic apparatus with the strengthening force structure as claimed in claim 2, wherein the supporting device is constituted by a connecting rod and a sleeve comprising an elastic member set with elastic coefficient therein.

7. The sliding-type electronic apparatus with the strengthening force structure as claimed in claim 3, wherein the supporting device is constituted by a connecting rod and a sleeve comprising an elastic member set with elastic coefficient therein.

8. The sliding-type electronic apparatus with the strengthening force structure as claimed in claim 5, wherein the connecting rod includes a rod body partially entered inside the sleeve, one end served as a continuously-connected end for the sliding member, and another end entered inside the sleeve and normally pressed against the elastic member, and the sleeve includes a bottom end pivoted to the opposite end portion of the support frame.

9. The sliding-type electronic apparatus with the strengthening force structure as claimed in claim 6, wherein the connecting rod includes a rod body partially entered inside the sleeve, one end served as a continuously-connected end for the sliding member, and another end entered inside the sleeve and normally pressed against the elastic member, and the sleeve includes a bottom end pivoted to the opposite end portion of the support frame.

10. The sliding-type electronic apparatus with the strengthening force structure as claimed in claim 7, wherein the connecting rod includes a rod body partially entered inside the sleeve, one end served as a continuously-connected end for the sliding member, and another end entered inside the sleeve and normally pressed against the elastic member, and the sleeve includes a bottom end pivoted to the opposite end portion of the support frame.

11. The sliding-type electronic apparatus with the strengthening force structure as claimed in claim 4, wherein the supporting device is constituted by a connecting rod and a sleeve comprising an elastic member set with elastic coefficient therein.

12. The sliding-type electronic apparatus with the strengthening force structure as claimed in claim 11, wherein the connecting rod includes a rod body partially entered inside the sleeve, one end served as a continuously-connected end for the sliding member, and another end entered inside the sleeve and normally pressed against the elastic member, and the sleeve includes a bottom end pivoted to the opposite end portion of the support frame.

13. The sliding-type electronic apparatus with the strengthening force structure as claimed in claim 1, wherein the supporting device is constituted by a plurality of connecting rods and a sleeve comprising a plurality of preset housing apertures which are provided for placing in a plurality of elastic members set with elastic coefficient.

14. The sliding-type electronic apparatus with the strengthening force structure as claimed in claim 2, wherein the supporting device is constituted by a plurality of connecting rods and a sleeve comprising a plurality of preset housing apertures which are provided for placing in a plurality of elastic members set with elastic coefficient.

15. The sliding-type electronic apparatus with the strengthening force structure as claimed in claim 3, wherein the supporting device is constituted by a plurality of connecting rods and a sleeve comprising a plurality of preset housing apertures which are provided for placing in a plurality of elastic members set with elastic coefficient.

16. The sliding-type electronic apparatus with the strengthening force structure as claimed in claim 13, wherein each of the connecting rods includes a rod body partially entered inside the sleeve, one end served as a continuously-connected end for the sliding member, and another end entered inside the sleeve and normally pressed against the elastic member, and the sleeve includes a bottom end pivoted to the opposite end portion of the support frame.

17. The sliding-type electronic apparatus with the strengthening force structure as claimed in claim 14, wherein each of the connecting rods includes a rod body partially entered inside the sleeve, one end served as a continuously-connected end for the sliding member, and another end entered inside the sleeve and normally pressed against the elastic member, and the sleeve includes a bottom end pivoted to the opposite end portion of the support frame.

18. The sliding-type electronic apparatus with the strengthening force structure as claimed in claim 15, wherein each of the connecting rods includes a rod body partially entered inside the sleeve, one end served as a continuously-connected end for the sliding member, and another end entered inside the sleeve and normally pressed against the elastic member, and the sleeve includes a bottom end pivoted to the opposite end portion of the support frame.

19. The sliding-type electronic apparatus with the strengthening force structure as claimed in claim 4, wherein the supporting device is constituted by a plurality of connecting rods and a sleeve comprising a plurality of preset housing apertures which are provided for placing in a plurality of elastic members set with elastic coefficient.

20. The sliding-type electronic apparatus with the strengthening force structure as claimed in claim 19, wherein each of the connecting rods includes a rod body partially entered inside the sleeve, one end served as a continuously-connected end for the sliding member, and another end entered inside the sleeve and normally pressed against the elastic member, and the sleeve includes a bottom end pivoted to the opposite end portion of the support frame.

* * * * *